United States Patent
Gosolits et al.

(10) Patent No.: US 8,177,291 B2
(45) Date of Patent: May 15, 2012

(54) FRONT-END FRAME CONCEPT FOR THE BODY STRUCTURE ON A MULTIPLE PLATFORM

(75) Inventors: Bernd Gosolits, Wiesbaden (DE); Radu-Mihail Visinescu, Frankfurt (DE)

(73) Assignee: GM Global Technology Operations LLC, Detroit, MI (US)

( * ) Notice: Subject to any disclaimer, the term of this patent is extended or adjusted under 35 U.S.C. 154(b) by 172 days.

(21) Appl. No.: 12/376,279

(22) PCT Filed: Jul. 27, 2007

(86) PCT No.: PCT/DE2007/001347
§ 371 (c)(1),
(2), (4) Date: Jun. 19, 2009

(87) PCT Pub. No.: WO2008/014770
PCT Pub. Date: Feb. 7, 2008

(65) Prior Publication Data
US 2010/0019542 A1   Jan. 28, 2010

(30) Foreign Application Priority Data
Aug. 4, 2006 (DE) .......................... 10 2006 036 455

(51) Int. Cl.
*B62D 21/02* (2006.01)
(52) U.S. Cl. .............. 296/193.05; 296/205; 296/203.02; 296/193.09; 280/785
(58) Field of Classification Search ............ 297/187.09, 297/187.12, 203.01–203.03, 205, 193, 193.09, 297/193.05; 280/781, 790, 797, 798, 800, 280/785; *B62D 21/01*
See application file for complete search history.

(56) References Cited

U.S. PATENT DOCUMENTS

| | | | |
|---|---|---|---|
| 2,838,322 A * | 6/1958 | Felts et al. | 280/800 |
| 3,827,712 A | 8/1974 | Suzuki et al. | |
| 4,822,096 A | 4/1989 | Fujii | |
| 5,280,957 A | 1/1994 | Hentschel et al. | |
| 5,466,033 A * | 11/1995 | Murakami et al. | 296/203.02 |
| 6,234,568 B1 * | 5/2001 | Aoki | 296/203.04 |
| 6,592,175 B2 | 7/2003 | Shibata | |
| 6,733,040 B1 * | 5/2004 | Simboli | 280/800 |

(Continued)

FOREIGN PATENT DOCUMENTS

CN   1715118 A   1/2006

(Continued)

OTHER PUBLICATIONS

German Patent Office, German Search Report for German Application No. 102006036455.4, dated Apr. 12, 2007.

(Continued)

*Primary Examiner* — Glenn Dayoan
*Assistant Examiner* — Pinel Romain
(74) *Attorney, Agent, or Firm* — Ingrassia Fisher & Lorenz, P.C.

(57) ABSTRACT

A longitudinal beam, which is provided for a chassis of a motor vehicle, has a curved section of a tubular member part horizontal reinforcement element. The reinforcement element is directly associated with the highest body of a lower horizontal limb of the tubular member part and is connected to an upper horizontal limb of the tubular member part. This draws the curved section in a crash of the vehicle a high degree of stability.

32 Claims, 3 Drawing Sheets

U.S. PATENT DOCUMENTS

| | | | |
|---|---|---|---|
| 7,097,235 B2 * | 8/2006 | Yasukouchi et al. | 296/187.03 |
| 7,104,597 B2 * | 9/2006 | Osato et al. | 296/203.04 |
| 7,185,945 B2 * | 3/2007 | Dandekar et al. | 296/187.09 |
| 7,520,557 B2 | 4/2009 | Yoshida et al. | |
| 7,631,918 B2 | 12/2009 | Yasukouchi et al. | |
| 7,651,155 B2 * | 1/2010 | Tan et al. | 296/187.03 |
| 2002/0163226 A1 | 11/2002 | Shibata | |
| 2004/0183340 A1 | 9/2004 | Tomita | |
| 2007/0200391 A1 | 8/2007 | Thoms | |

FOREIGN PATENT DOCUMENTS

| | | |
|---|---|---|
| DE | 2254299 A1 | 6/1973 |
| DE | 4414472 A1 | 11/1995 |
| DE | 19720640 A1 | 10/1997 |
| DE | 19928107 A1 | 1/2001 |
| DE | 10159542 A1 | 10/2002 |
| DE | 10231807 A1 | 2/2004 |
| DE | 102009031780 A1 | 1/2011 |
| EP | 0530594 A1 | 3/1993 |
| EP | 1808362 A2 | 7/2007 |
| WO | 2005047088 A1 | 5/2005 |

OTHER PUBLICATIONS

International Searching Authority, International Search Report for PCT Application No. PCT/DE2007/001347, dated Dec. 4, 2007.

* cited by examiner

FRONT-END FRAME CONCEPT FOR THE BODY STRUCTURE ON A MULTIPLE PLATFORM

CROSS-REFERENCE TO RELATED APPLICATIONS

This application is a U.S. National-Stage entry under 35 U.S.C. §371 based on International Application No. PCT/DE2007/001347, filed Jul. 27, 2007, which was published under PCT Article 21(2), and claims priority to German Application No. 102006036455.4, filed Aug. 4, 2006, which are all hereby incorporated in their entirety by reference.

TECHNICAL FIELD

The invention relates to a longitudinal member for a body of a motor vehicle comprising a tubular member part extending in the direction of travel with a straight section of the member part, comprising a curved section of the tubular member part guided over a wheel recess, and a reinforcement element of the curved section of the tubular member part, the reinforcement element being located inside the curved section of the tubular member part.

BACKGROUND

Longitudinal members are known, for example, from DE 102 31 807 A1. In this longitudinal member, the reinforcement element is fastened in an angled manner to vertical limbs of the tubular member part. The angled reinforcement element additionally has lateral webs for fastening to the vertical limbs. As a result, the member part is a component which is complex to manufacture. Furthermore, this configuration leads to a very high stiffening of the vertical limbs of the member part. In the event of a crash of the motor vehicle, however, forces are principally introduced into a lower horizontal limb of the member part. The known longitudinal member is therefore very resilient in the curved region in the event of a crash of the motor vehicle.

Furthermore known from DE 44 14 472 A1 is a motor vehicle body in which the reinforcement part in an arc of the member part is fastened to the lower horizontal limb and to the vertical limbs. By this means, in the event of a crash of the motor vehicle, the forces are introduced from the lower horizontal limb into the vertical limb. This configuration of the longitudinal member also results in the resilience of the curved region being too high in the event of a crash of the motor vehicle.

In view of the foregoing, it is at least one object of the invention to further develop a longitudinal member of the type specified initially in such a manner that in the event of a motor vehicle crash, it has a particularly high load-bearing capacity in the curved region. In addition, other objects, desirable features, and characteristics will become apparent from the subsequent summary and detailed description, and the appended claims, taken in conjunction with the accompanying drawings and this background.

SUMMARY

This at least one object, other objects, desirable features, and characteristics, are achieved according to an embodiment of the invention by the reinforcement element being arranged straight through at least a partial area of the curved section and between a lower horizontal limb to an upper horizontal limb of the tubular member part.

Due to this configuration, the forces in the longitudinal member according to an embodiment of the invention in the event of a crash of the motor vehicle are introduced directly from the lower horizontal limb into the upper horizontal limb. The reinforcement element therefore stabilizes the curved region, which is critical for the stiffness of the longitudinal member. The longitudinal member according to the invention therefore has a particularly high load-bearing capacity in the curved region in the event of a crash of the motor vehicle. Due to the embodiment of the invention, the kinetic energy introduced into the longitudinal member in the event of a crash is dissipated near the region of the longitudinal member pointing in the direction of travel of the motor vehicle. Furthermore, the longitudinal member according to the embodiment of the invention has a particularly low weight as a result.

In order to further increase the load-bearing capacity of the longitudinal member according to an embodiment of the invention, it is helpful if the reinforcement element is guided from the lower horizontal limb to the upper horizontal limb opposite to the intended direction of travel of the motor vehicle.

A reliable introduction of forces from the reinforcement element into the upper horizontal limb of the member part can be achieved simply according to another advantageous further embodiment of the invention if the end of the reinforcement element pointing in the direction opposite the direction of travel abuts against the upper horizontal limb of the member part or is located directly opposite the upper horizontal limb.

The provided stiffness of the longitudinal member according to an embodiment of the invention can be adjusted simply if, on the opposite section of the upper horizontal limb, the end of the reinforcement element pointing in the direction opposite the direction of travel has a supporting part connected to adjacent regions of the upper horizontal limb. The stiffness can be adjusted by a suitable choice of material or material thickness and shape of the supporting part.

A reliable introduction of forces from the lower horizontal limb into the reinforcement element of the member part can be achieved simply according to another advantageous further embodiment of the invention if the reinforcement element is connected directly to the highest point of the lower horizontal limb of the curved section.

A straight guidance of the forces inside the longitudinal member according to an embodiment of the invention can be achieved simply if the reinforcement element is arranged substantially horizontally in the member part. Due to this configuration, the risk of kinking of the reinforcement element is kept particularly low. Furthermore, this configuration contributes to a further reduction in the weight of the longitudinal member according to an embodiment of the invention.

According to another advantageous further embodiment of the invention, the reinforcement element has a high stability if the reinforcement element is configured to have a U-shaped cross section.

In order to further increase stability of the curved section of the longitudinal member according to an embodiment of the invention, it is helpful if lateral webs of the U-shaped reinforcement element are fastened to vertical limbs of the tubular member part.

In order to further stiffen the curved section, according to another advantageous further embodiment of the invention it is helpful if the reinforcement element has a central web and if the central web is fastened to a flange disposed on the lower horizontal limb of the member part.

In order to simplify the manufacture of the reinforcement element, according to another advantageous further embodiment of the invention it is helpful if the reinforcement element comprises at least two interconnected reinforcement parts and if each of the reinforcement parts comprises one of the lateral webs.

An internal combustion engine of the motor vehicle is usually connected to the longitudinal member via an engine mounting. The longitudinal member according to an embodiment of the invention has a particularly high stability in the area of the connection of the internal combustion engine if the reinforcement element is connected directly to an engine mounting.

According to another advantageous further embodiment of the invention, the connection of the reinforcement element to the engine mounting is configured constructively particularly simply if the reinforcement element has a mounting flange disposed in alignment with a mounting eye of the member part.

In order to further increase the stability of the longitudinal member according to the an embodiment of invention in the curved section, it is helpful if the reinforcement element is configured as fork-shaped at one end and is guided with a first fork element as far as the upper horizontal limb and with a second fork element as far as the lower horizontal limb.

BRIEF DESCRIPTION OF THE DRAWINGS

The embodiments of the present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
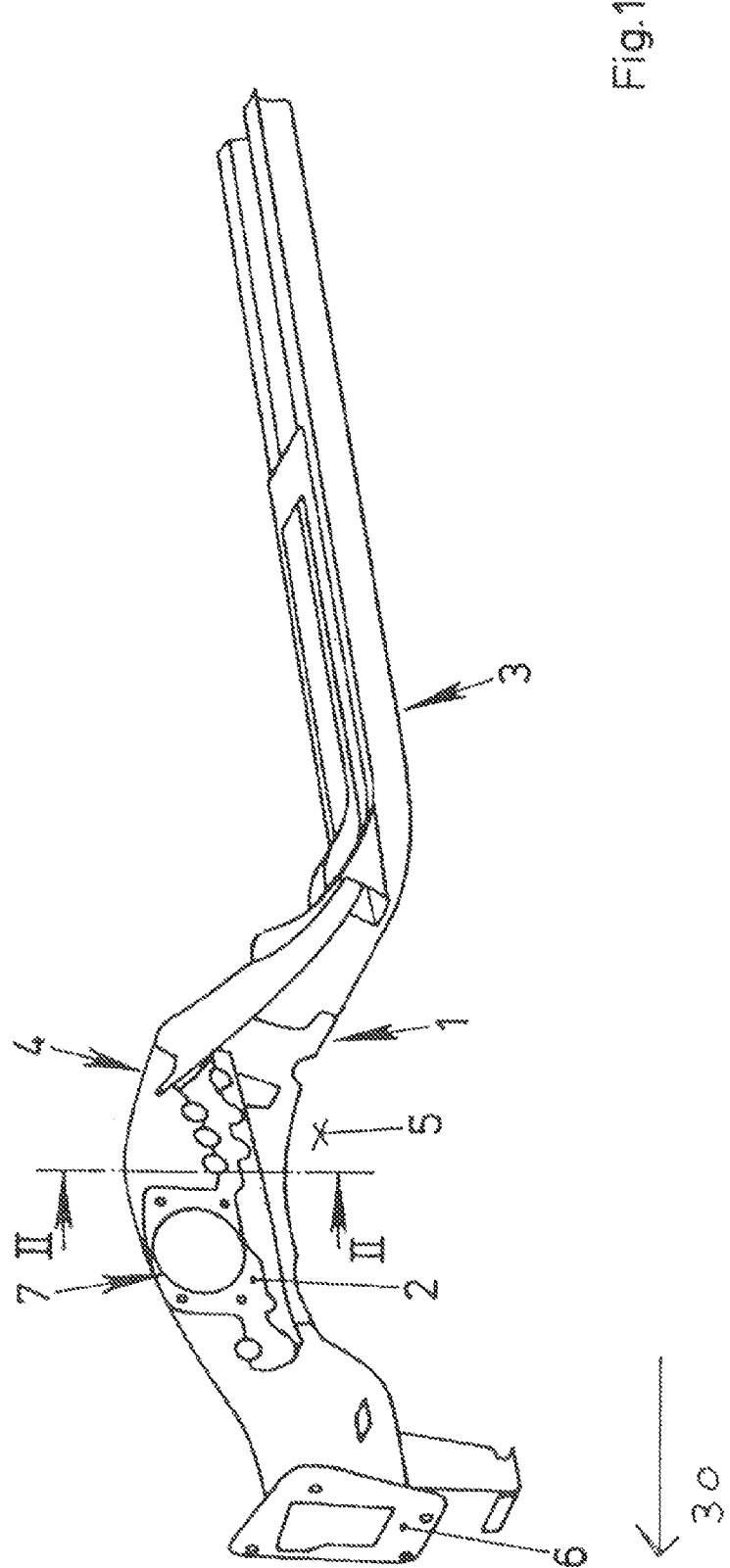
FIG. 1 shows a perspective view of a longitudinal member according to an embodiment of the invention.

FIG. 1 shows a longitudinal member for a body of a motor vehicle comprising a tubular member part 1. A reinforcement element 2 is located in the tubular member part 1. For illustration the longitudinal member is shown open. The tubular member part 1 has a straight section 3 and a curved section 4, which is guided over a wheel recess 5 of the motor vehicle body. An end of the member part 1 pointing in the intended direction of travel 30 of the motor vehicle has a flange 6 for connection of a crashbox. Usually fastened to this end of the longitudinal member is a transverse member, not shown, which connects two longitudinal members disposed on each side of the body. The longitudinal member additionally has a mounting eye 7 for an engine mounting of an internal combustion engine of the motor vehicle.

Figure 2:
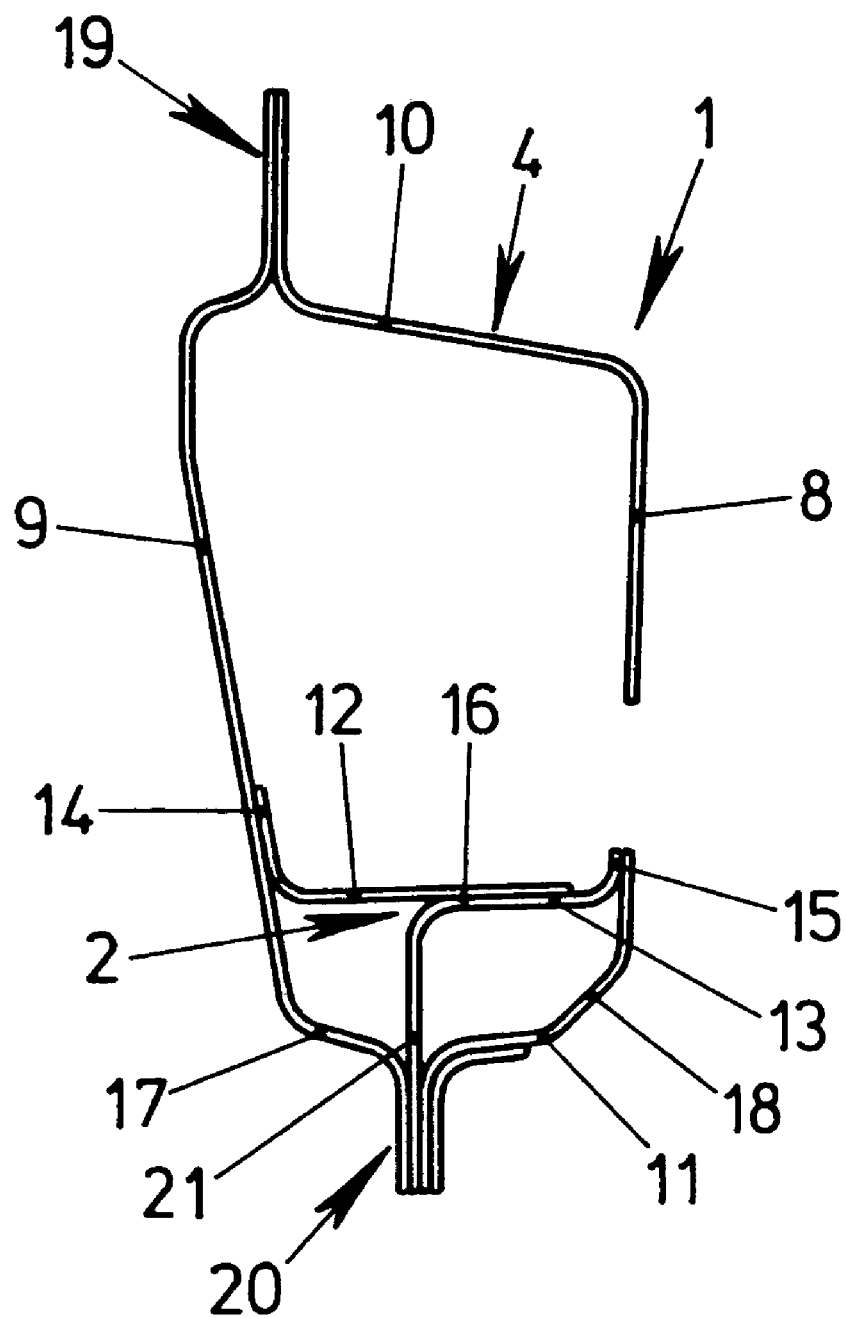
FIG. 2 shows a section view through the longitudinal member according to an embodiment of the invention from FIG. 1 along the line II-II.

In a cross-sectional view through the longitudinal member from FIG. 1 in the area of the curved section 4 along the line II-II, FIG. 2 shows that the member part 1 is tubular in shape and comprises two vertical limbs 8, 9, an upper horizontal limb 10 and a lower horizontal limb 11. The reinforcement element 2 comprises two reinforcement parts 12, 13 connected to one another. The reinforcement parts 12, 13 each have a vertically extending lateral web 14, 15. The lateral webs 14, 15 are each fastened to one of the vertical limbs 8, 9 and connected to one another at a common base 16. The lateral webs 14, 15 and the common base 16 forms a U shape of the reinforcement element 2. The curved section 4 of the member part 1 is composed of two shell parts 17, 18, which are connected to one another at the upper and lower horizontal limbs 10, 11 via flanges 19, 20. Furthermore, the reinforcement element 2 has a central web 21, which is fastened to the flanges 20 located on the lower horizontal limb 11 of the member part 1.

Figure 3:
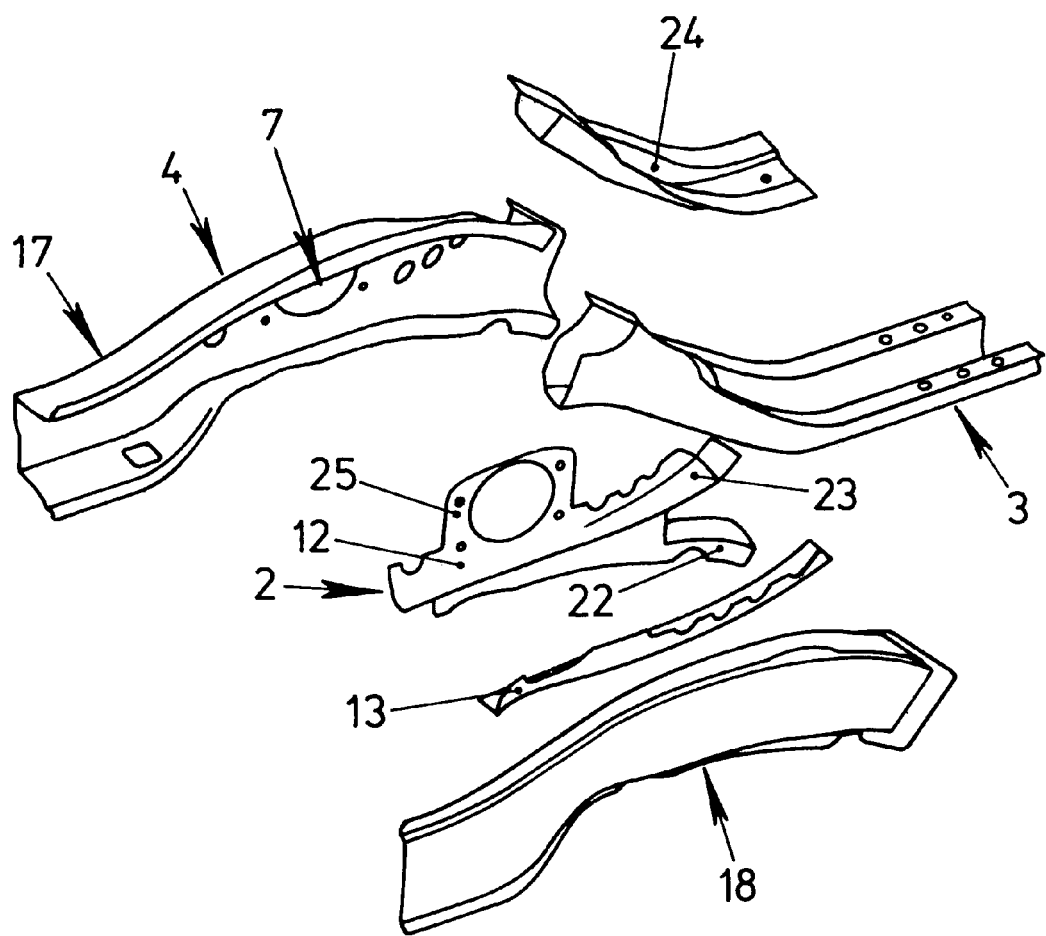
FIG. 3 shows an exploded view of the longitudinal member according to an embodiment of the invention from FIG. 1.

In an exploded view of the longitudinal member, FIG. 3 shows that the curved section 4 and the straight section 3 of the member part 1 are connected to one another. One of the reinforcement parts 12 of the reinforcement element 2 is configured as fork-shaped and is fastened with one fork element 22 to the lower horizontal limb 11 and with the other fork element 23 to the upper horizontal limb 10. The upper horizontal limb 10 has a supporting part 24 for supporting the forces introduced by the reinforcement element 2 into the member part 1. The reinforcement element 2 has a mounting flange 25 disposed in alignment with the mounting eye 7 of the member part 1. In the mounted state of the longitudinal member shown in FIG. 1, the reinforcement element 2 lies at the highest point of the lower horizontal limb 11 and extends horizontally to the upper horizontal limb 10 of the member part 1.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A longitudinal member for a body of a motor vehicle, comprising:
    a tubular member part extending in a direction of travel with a straight section of the tubular member part;
    a curved section of the tubular member part guided over a wheel recess;
    a reinforcement element located inside the curved section of the tubular member part and arranged straight through at least a partial area of the curved section and between a lower horizontal limb to an upper horizontal limb of the tubular member part; and
    an end of the reinforcement element pointing in a opposite direction to the direction of travel abuts against the upper horizontal limb of the tubular member part.

2. The longitudinal member according to claim 1, wherein the reinforcement element is guided from the lower horizontal limb to the upper horizontal limb opposite to an intended direction of travel of the motor vehicle.

3. The longitudinal member according to claim 1, wherein the reinforcement element is connected directly to a substantially highest point of the lower horizontal limb of the curved section.

4. The longitudinal member according to claim 1, wherein the reinforcement element is arranged substantially horizontally in the tubular member part.

5. The longitudinal member according claim 1, wherein the reinforcement element is configured to have a U-shaped cross section.

6. The longitudinal member according to claim 5, wherein a lateral web of the reinforcement element, which is configured to have the U-Shaped cross section, is fastened to a vertical limb of the tubular member part.

7. The longitudinal member according to claim 1, wherein the reinforcement element has a central web and the central web is fastened to a flange disposed on the lower horizontal limb of the tubular member part.

8. The longitudinal member according to claim 1, wherein the reinforcement element comprises at least two interconnected reinforcement parts and each of the two interconnected reinforcement parts comprisesa lateral web.

9. The longitudinal member according to claim 1, wherein the reinforcement element is connected directly to an engine mounting.

10. The longitudinal member according to claim 1, wherein the reinforcement element has a mounting flange disposed in alignment with a mounting eye of the tubular member part.

11. The longitudinal member according claim 1, wherein the reinforcement element is configured as fork-shaped at one end and is guided with a first fork element as far as the upper horizontal limb and with a second fork element as far as the lower horizontal limb.

12. A longitudinal member for a body of a motor vehicle, comprising:
 a tubular member part extending in a direction of travel with a straight section of the tubular member part;
 a curved section of the tubular member part guided over a wheel recess; and
 a reinforcement element located inside the curved section of the tubular member part and arranged straight through at least a partial area of the curved section and between a lower horizontal limb to an upper horizontal limb of the tubular member part,
 wherein the reinforcement element is connected directly to a substantially highest point of the lower horizontal limb of the curved section,
 wherein an end of the reinforcement element pointing in an opposite direction to the direction of travel abuts against the upper horizontal limb of the tubular member part.

13. The longitudinal member according to claim 12, wherein the reinforcement element is guided from the lower horizontal limb to the upper horizontal limb opposite to an intended direction of travel of the motor vehicle.

14. The longitudinal member according to claim 12, wherein the reinforcement element is arranged substantially horizontally in the tubular member part.

15. The longitudinal member according claim 1, wherein the reinforcement element is configured to have a U-shaped cross section.

16. The longitudinal member according to claim 15, wherein a lateral web of the reinforcement element, which is configured to have the U-Shaped cross section, is fastened to a vertical limb of the tubular member part.

17. The longitudinal member according to claim 12, wherein the reinforcement element has a central web and the central web is fastened to a flange disposed on the lower horizontal limb of the tubular member part.

18. The longitudinal member according to claim 12, wherein the reinforcement element comprises at least two interconnected reinforcement parts and each of the two interconnected reinforcement parts comprises a lateral web.

19. The longitudinal member according to claim 12, wherein the reinforcement element is connected directly to an engine mounting.

20. The longitudinal member according to claim 12, wherein the reinforcement element has a mounting flange disposed in alignment with a mounting eye of the tubular member part.

21. The longitudinal member according claim 12, wherein the reinforcement element is configured as fork-shaped at one end and is guided with a first fork element as far as the upper horizontal limb and with a second fork element as far as the lower horizontal limb.

22. A longitudinal member for a body of a motor vehicle, comprising:
 a tubular member part extending in a direction of travel with a straight section of the tubular member part;
 a curved section of the tubular member part guided over a wheel recess; and
 a reinforcement element located inside the curved section of the tubular member part and arranged straight through at least a partial area of the curved section and between a lower horizontal limb to an upper horizontal limb of the tubular member part,
 wherein the end of the reinforcement element pointing in the opposite direction to the direction of travel has a fork element connected to adjacent regions of the upper horizontal limb.

23. The longitudinal member according to claim 22, wherein the reinforcement element is guided from the lower horizontal limb to the upper horizontal limb opposite to an intended direction of travel of the motor vehicle.

24. The longitudinal member according to claim 22, wherein the reinforcement element is connected directly to a substantially highest point of the lower horizontal limb of the curved section.

25. The longitudinal member according to claim 22, wherein the reinforcement element is arranged substantially horizontally in the tubular member part.

26. The longitudinal member according claim 22, wherein the reinforcement element is configured to have a U-shaped cross section.

27. The longitudinal member according to claim 26, wherein a lateral web of the reinforcement element, which is configured to have the U-Shaped cross section, is fastened to a vertical limb of the tubular member part.

28. The longitudinal member according to claim 22, wherein the reinforcement element has a central web and the central web is fastened to a flange disposed on the lower horizontal limb of the tubular member part.

29. The longitudinal member according to claim 22, wherein the reinforcement element comprises at least two interconnected reinforcement parts and each of the two interconnected reinforcement parts comprises a lateral web.

30. The longitudinal member according to claim 22, wherein the reinforcement element is connected directly to an engine mounting.

31. The longitudinal member according to claim 22, wherein the reinforcement element has a mounting flange disposed in alignment with a mounting eye of the tubular member part.

32. The longitudinal member according claim 22, wherein the reinforcement element is configured as fork-shaped at one end and is guided with a first fork element as far as the upper horizontal limb and with a second fork element as far as the lower horizontal limb.

* * * * *